United States Patent [19]

Stehl et al.

[11] 4,282,856
[45] Aug. 11, 1981

[54] SOLAR-ENERGY COLLECTOR

[75] Inventors: Otto Stehl, Essen-Bredeney; Hans Spakowski, Gelsenkirchen, both of Fed. Rep. of Germany

[73] Assignee: BFG Glassgroup, Paris, France

[21] Appl. No.: 930,173

[22] Filed: Aug. 2, 1978

[30] Foreign Application Priority Data

Aug. 2, 1977 [DE] Fed. Rep. of Germany ....... 2734709

[51] Int. Cl.³ .................................................. F24J 3/02
[52] U.S. Cl. .................................... 126/417; 126/445; 126/449; 126/450; 126/901
[58] Field of Search .............. 126/449, 444, 901, 429, 126/445, 417, 450, 431; 52/304, 791, 172; 165/485

[56] References Cited

U.S. PATENT DOCUMENTS

| 201,439 | 3/1878 | Moreau | 126/449 |
|---|---|---|---|
| 2,439,553 | 4/1948 | Winn | 126/417 X |
| 3,107,052 | 10/1963 | Garrison | 126/419 |
| 3,949,732 | 4/1976 | Reines | 126/431 X |
| 3,981,294 | 9/1976 | Deminet et al. | 126/445 X |
| 3,987,781 | 10/1976 | Nozik et al. | 126/443 |
| 4,044,519 | 8/1977 | Morin et al. | 52/304 |
| 4,081,934 | 4/1978 | Franz | 52/790 |
| 4,082,082 | 4/1978 | Harvey | 126/448 |
| 4,098,265 | 7/1978 | Gravely | 126/450 |
| 4,127,102 | 11/1978 | Berman | 126/444 |

FOREIGN PATENT DOCUMENTS

| 2615686 | 4/1975 | Fed. Rep. of Germany . |
|---|---|---|
| 2523965 | 5/1975 | Fed. Rep. of Germany . |
| 2600598 | 7/1977 | Fed. Rep. of Germany ........... 126/445 |

OTHER PUBLICATIONS

"Glass Solar Heat Collector Development", Jan. 1976 (NTIS #PB-253150).

Primary Examiner—James C. Yeung
Assistant Examiner—Larry Jones
Attorney, Agent, or Firm—Karl F. Ross

[57] ABSTRACT

A solar-energy collector has a frame receiving a double-pane unit consisting of a pair of transparent panes hermetically sealed together and defining the flow chamber for the heat-collecting fluid. The frame also supports a cover pane which defines, with the aforementioned unit, a heat-insulating dead-air space. The pane of the unit turned toward the sun is provided with an emission-limiting coating on its side facing the dead-air space while the pane of the unit turned away from the sun is provided with means for increasing its heat-absorption capacity. The frame members at opposite sides of the collector can be provided with fittings for connecting the collector to a source of the heat-absorbing fluid and to the output line of the collector.

12 Claims, 7 Drawing Figures

SOLAR-ENERGY COLLECTOR

FIELD OF THE INVENTION

The present invention relates to a solar-energy collector and, more particularly, to a solar collector of the type in which thermal energy is transferred to a flowing fluid.

BACKGROUND OF THE INVENTION

It is known to provide solar-energy collectors with flow chambers traversed by an energy-absorbing fluid, a gas-containing heat-insulating space between the flow chamber and the source of solar energy, i.e. the sun, and a frame supporting this structure.

Generally the frame carries an outer covered glass pane which defines the outer insulating chamber and is provided with fittings which connect the flow chamber or channels into the circulating line for the fluid.

The heat-insulating chamber can be filled with air or another gas or a gas mixture and is generally under at most ambient (atmospheric) pressure although it may also be under a subatmospheric pressure to reduce convective heat loss.

The fluid is a heat exchange medium which can be selected so that it is highly heat-absorbent itself or may merely take up heat by heat exchange with the heat-absorbing surfaces of the flow chamber.

The flow chamber thus functions also as a heat exchanger in which the incident solar radiation is transformed into sensible heat energy which, in turn, is transferred to or picked up by the fluid.

When reference is made herein to glass panes, it should be understood that transparent plates or sheets are intended and that these can be also composed of synthetic-resin material.

A solar collector of the aforedescribed type is described in publication P.B.-253 150, 1976, page 64, U.S. Department of Commerce, National Technical Information Service, the solar-energy collector being provided in the flow chamber with flow passages or channels. In this construction the flow chamber is a separate structure requiring especially expensive fabrication techniques.

In other fields it is known to provide, for acoustic insulation and/or thermo-insulation purposes, insulating glass units, i.e. so-called double-pane units, which consist of inner and outer panes defining a dead-air space between them and sealing means surrounding the space and holding the panes apart. The space may contain air or another gas filling, may be evacuated or may be under reduced pressure.

In all such units, however, the two panes are sealed directly together or are sealed together via the aforementioned sealing means.

The spacer frame can be a separate element or can be formed by bending the glass panes at their perimeters. In the latter case, the bent flanges of a glass pane may be sealed to the opposing glass pane to form the hermetically sealed unit.

In the glass industry, the fabrication techniques for such units are relatively simple and well developed and insulating double-pane units of this type are widely used. However, such double-pane units have not, to date, been applied to our knowledge in solar collectors nor have the techniques used in fabricating such units been applied to solve the problems encountered in the fabrication of solar collectors.

Mention should also be made of the fact that it is known, in the solar-energy-collector art, to provide the highest possible absorption capacity and minimum emission capability so as to make the collector efficiency as high as possible.

Maximum absorption capacity means that as much as possible of the incident solar energy should be absorbed and retained in the form of sensible heat in the solar collector while reduced emission capability implies that as little as possible of the incident solar energy should be re-radiated as heat or reflected from the collector.

To this end it is known to provide the solar-energy collector with two layers, namely, an emission-limiting layer on a surface of the solar collector turned toward the sun and a layer of high absorption capability preferably upon a surface turned away from the sun.

This is achieved in certain prior-art devices by providing the solar-energy collector with a collector plate composed of sheet metal which defines the flow chamber on the solar-energy-incident side of the device (see German open application-Offenlegungsschrift-No. DT-OS 26 15 686). It is also known to provide the flow chambers as glass cubes which are of the type described in German open application-Offenlegungsschrift-No. DT-OS 25 39 965.

Even these techniques have not, however, solved the major problems which have hitherto been encountered with solar-energy collectors with respect to maximizing the absorption efficiency and reducing re-emitted radiation.

As a practical matter it is found that most of the absorption takes place by the absorption layer so that the heat must be transferred by a wall of the collector carrying or constituting the absorption layer to the fluid traversing the flow chamber. As a result, the fluid does not function effectively to pick up solar energy directly and efficiency loss results from the need to provide an additional heat transfer at the interface between the absorption layer and the wall and at the interface between the wall and the fluid.

When the flow chambers of the solar-energy collector are constituted of metal or are defined between metal walls, considerable efficiency loss may also result from re-reflection and conductive dissipation of the solar energy.

OBJECT OF THE INVENTION

It is the principal object of the present invention to provide a solar-energy collector for the purposes described which can be simply fabricated, is relatively inexpensive and is of high efficiency while avoiding many of the disadvantages of earlier systems including the disadvantages described above.

SUMMARY OF THE INVENTION

This object and others which will become apparent hereinafter are attained, in accordance with the present invention, in a solar-energy collector which comprises a support frame receiving a hermetically sealed double-pane unit defining the flow chamber for the fluid adapted to take up the solar energy, and a transparent pane spaced from this unit and defining therewith a heat-insulating gas-containing chamber. That chamber may be referred to as a dead-air space even though, as noted above, the gas it contains is not necessarily air.

The aforementioned spacer frame is provided with fittings enabling communication between the flow chamber and external fluid lines to which the solar collector is to be connected.

According to an essential feature of the invention the transparent pane of the double-pane unit turned toward the sun, i.e. the pane through which solar energy enters the flow chamber, is formed with a coating of reduced emission capability facing the dead-air space while the transparent pane interior of this double-pane unit is provided with some means for intensifying the heat transfer between the incident sunlight and the carrier fluid.

Advantageously, both panes of the double-pane unit made of glass.

Because the double-pane unit can be formed by techniques which are common and well developed in the fabrication of insulating glass units of the aforedescribed type, the double-pane units can be prefabricated at low cost and without difficulty for use in the solar-energy collector of the present invention. The invention thus provides a new use for the insulating double-pane units fabricated by conventional techniques.

According to a preferred feature of the invention, one of the glass panes of the double-pane insulating-glass unit is formed with profiles, e.g. during the usual rolling process for fabricating glass plates, which define flow passages with the other pane of the unit. Most advantageously, the profiled glass pane is the one turned away from the sun.

The coating for limiting the emission capability of the unit, carried on the front side of the incident glass pane opposite the flow space, can be applied by any conventional means, preferably vapor deposition, and can consist of known emission-reducing materials.

We prefer to use tin dioxide, indium oxide, cadmium stannate or mixtures thereof, or multilayer systems of the titanium-dioxide/silver/titanium-dioxide type.

To increase the heat-absorbing capacity of the glass mase of the pane remote from the dead-air space, we may color this pane dark or black, e.g. by the introduction of an appropriate additive into the glass, or simple apply a dark or black coating thereto. The glass mass can also be given an increased absorption capability by embedding therein, and in the profiles which define the flow channels, substances which have a high heat-absorbing capability, e.g. dark-coated metal fibers or the like.

It is frequently desirable to pass the fluid through the flow passages at a subatmospheric pressure in which case we have found it advantageous to design the profile of the remote glass pane as passage-defining partitions which have the full height or depth of the flow space and which are bonded to an unprofiled glass pane at the incident side of the unit.

The bonding can be effected by thermal fusion, i.e. direct glass-to-glass fusion, or by application of an adhesive.

We have further found it advantageous to provide turbulence-generating means in each of the flow passages so as to increase the rate of heat transfer between the fluid, e.g. a liquid such as water, and the walls of the glass panes defining the double-pane unit. The turbulence-generating elements can be grids, screens or the like which may extend the full length of the flow passages and preferably are corrugated or undulating in the flow direction.

These turbulence-promoting or turbulence-generating grids can be composed of wire, perforated sheet, expanded metal or the like. In any case, the material from which the grids are composed should be corrosion-resistant and not readily attacked by the fluid.

The grids can be fabricated simply since they need merely be introduced into the flow passages.

We also prefer that the grid should present a practically uninterrupted surface to the incident solar energy.

This can be the case if the grid is formed from thin wire and is corrugated. The grid may be composed of wire fabric or wire netting and, because of the undulations, practically has all of its surfaces inclined to a perpendicular to the panes of glass and hence to the direction of incident energy. As a result, the projection of the wires of the screen, fabric or netting upon a plane perpendicular to the incident sunlight will be practically closed so that absorption is promoted and re-emission is rendered negligible. Naturally, absorption can be increased further by providing the grid surface turned toward the sun with a black coating. The same effect can be achieved if the front surface of the wire mesh, netting or fabric is provided with an oxide or roughening coating.

Because of the multiperforate condition of the grid, it is capable of breaking up the flow of fluid into a multiplicity of streamlets each of which is accelerated on each passage through the grid, thereby producing an effective turbulence and hence a high heat-transfer efficiency on contact with the wire mesh and the walls of the flow chambers or passages. A surprising characteristic of the device is that while the effective surface exposed to the solar energy of the mesh or screen is closed, the flow resistance which is primarily transverse to the screen is minimal since the mesh as seen by the oncoming fluid is practically completely open.

A principal advantage of the system of the present invention is that it can make use of techniques well known in the glass industry for fabrication of insulating glass units to provide a unit of increased collection efficiency.

Moreover, we prefer to form the unit at opposite frame edges, with manifolds communicating with the aforementioned fittings and with each of the flow passages.

The two remaining edges of the unit can be sealed by spacer bars and sealing compounds or by bent flanges or edges of the glass panes.

BRIEF DESCRIPTION OF THE DRAWING

The above and other features of the present invention will become apparent from the following description, reference being made to the accompanying drawing in which.

SPECIFIC DESCRIPTION

Figure 1:
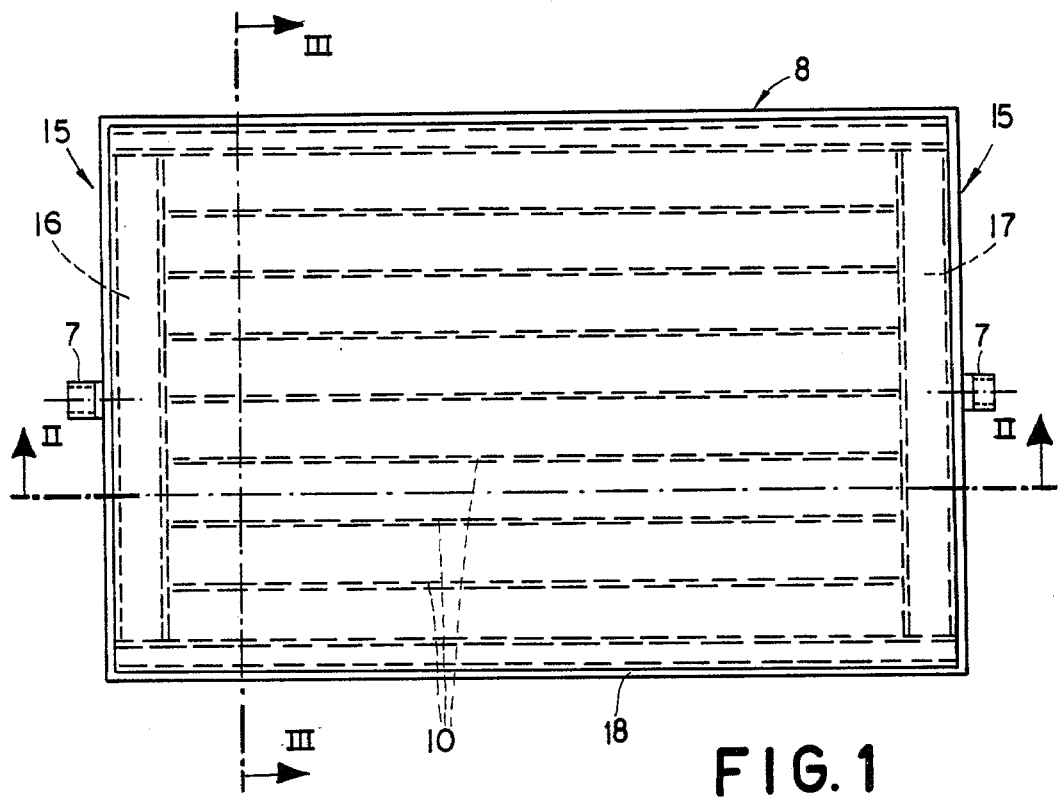
FIG. 1 is a plan view of a solar-energy collector according to the present invention, partly in diagrammatic form.
Figure 2:
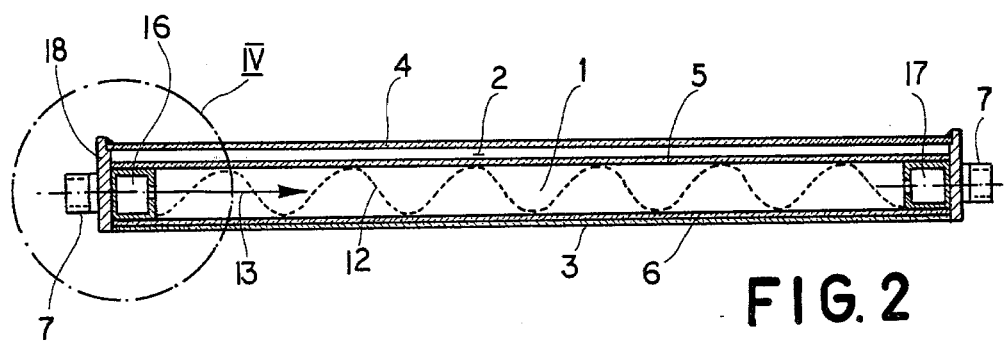
FIG. 2 is a cross-sectional view taken along the line II—II of FIG. 1.
Figure 3:
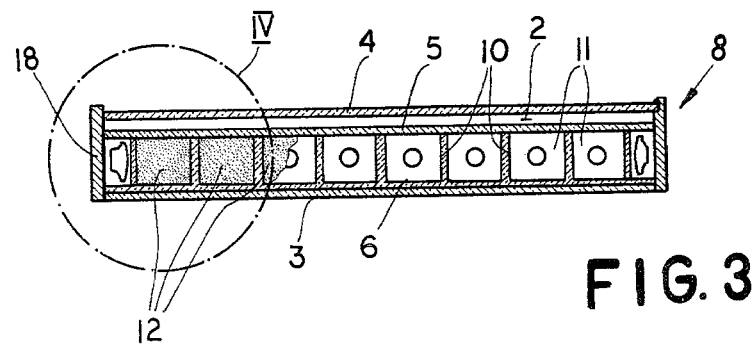
FIG. 3 is a cross-sectional view taken along the line III—III of FIG. 1.

The solar-energy collector shown in FIGS. 1-5 is provided in the usual manner with a flow chamber 1 separated from the atmosphere on the side of incident solar energy by a gas-containing thermo-insulating dead-air space 2. The side of the apparatus turned away from the sun is formed with an insulating layer 3 of glass or the like.

In this embodiment the thermo-insulating dead-air space 2 is closed against the atmosphere by an outer cover in the form of a glass pane 4. The flow chamber 1 is defined between a first or incident glass pane 5, turned towards the sun, and a second or remote glass pane 6, turned away from the sun.

Inlet and outlet fittings 7 are provided for admitting an heat-carrying fluid to chamber 1 and for discharging this fluid from the collector.

The apparatus is provided with a box-like frame 18 to support the various elements described.

According to the invention, the glass panes 5 and 6 define a hermetically sealed double-pane insulating glass unit which can be peripherally sealed by a pair of manifolds described below and a spacer profile 50 embedded in a potting material of elastomeric character, e.g. a polyurethane foam, represented at 51 in FIG. 5. Similar seals of putting material can bond the panes 5 and 6 to the manifolds.

Figure 4:
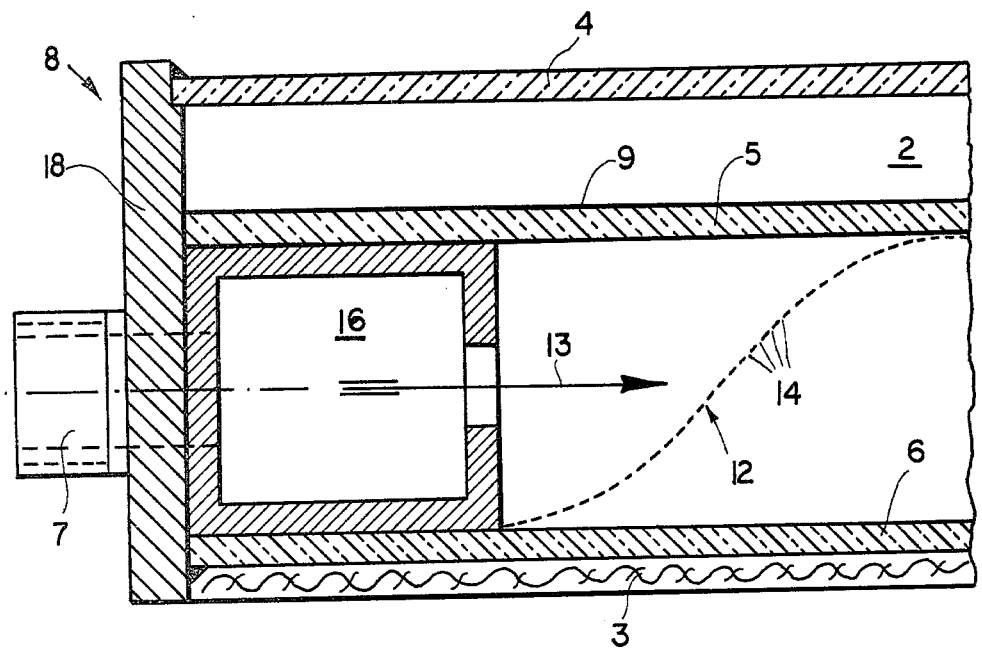
FIG. 4 is a detail view, drawn to an enlarged scale, of the region IV of FIG. 2.
Figure 5:
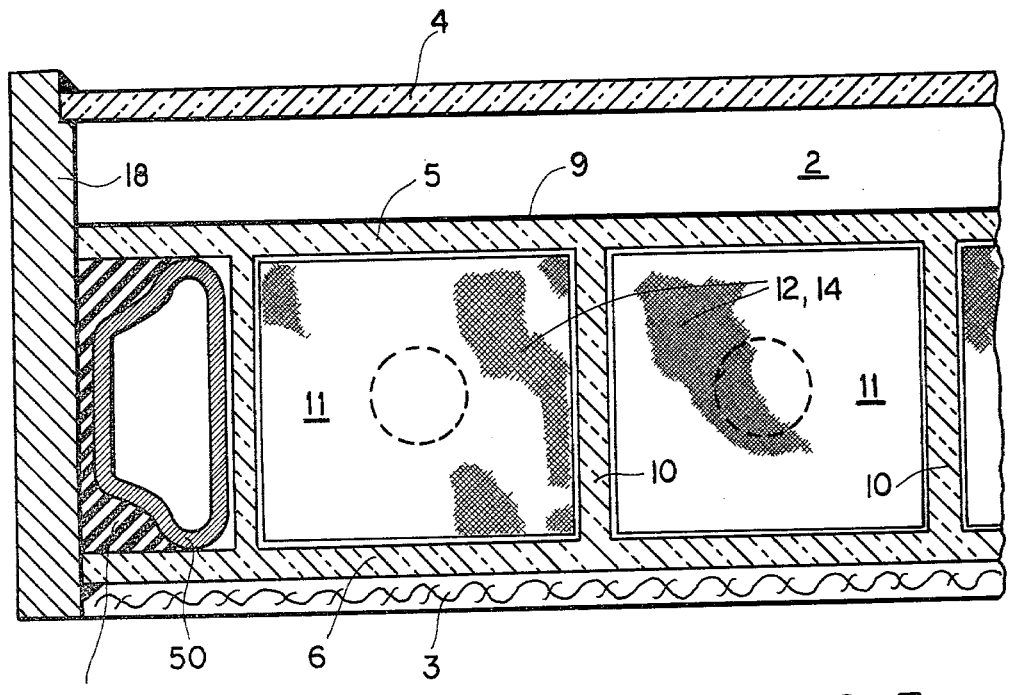
FIG. 5 is a detail view, drawn to an enlarged scale, of the region V of FIG. 3.

As can be seen especially from FIGS. 4 and 5, the incident glass pane 5 of the double-pane insulating-glass unit 1 is formed on its front surface with a coating 9 to reduce emission from the unit. The coating 9 can be composed, of tin dioxide, indium oxide or some other of the aforedescribed materials. This coating is applied by vapor deposition.

The remote glass pane 6 has a high heat-absorbing capability. This can be achieved by applying a black coating to the pane, by coloring the glass mass thereof black, or by embedding absorption-promoting substances in this glass mass.

In the embodiment illustrated in FIGS. 1-5 constituting the best-mode embodiment of the present invention, the second pane 6 is formed unitarily with profile elements 10 which constitute partitions and which are sealed to the planar first glass pane 5 to define flow passages 11 for the fluid.

Thus, the profiles 10 function not only as spacers between the glass panes but also as passage-defining partitions. The planar glass pane 5 can be thermally fused to the partitions 10.

As can further be seen from FIGS. 4 and 5, the flow passages 11 receive turbulence-promoting or turbulence-producing grids 12, composed of synthetic-resin filaments or metal wire not subject to corrosion by the fluid.

As illustrated, the turbulence-inducing strips 12 are corrugated in the flow direction. They can be wire fabric or netting (mesh) and preferably are composed of metal wire with good heat conductivity and low corrodibility. The surface of the wire mesh 12 turned toward the sun can have a dark oxide coating, e.g. applied by anodization.

FIGS. 4 and 5 also show that, because of the incline of most of the surfaces of the turbulence-inducing mesh to the direction of incident radiation, its surface as seen by the sun is practically closed, thereby increasing the absorption capability.

However, since the screen lies generally transverse to the fluid flow direction 13, the grid openings or meshes 14 pass the flow freely. This ensures an excellent heat transfer.

It is possible, within the framework of the present invention, to make the rear wall of the double-pane unit of a material other than glass, e.g. a synthetic resin or metal.

The unit is preferably so constructed that frame elements are provided along opposite edges 15 and are constituted as manifolds 16 and 17 for feeding the fluid to and withdrawing the fluid from the flow passages 11.

Naturally, when the double-pane unit is of the type in which the edge spaces are formed by bent portions or flanges of the glass, these may be provided with corresponding openings to admit or discharge the fluid and to receive the connection fittings in the manner previously described. Normally, however, the connection fittings are provided directly in the frame members in registry with appropriate openings of the double-pane unit.

Figure 6:
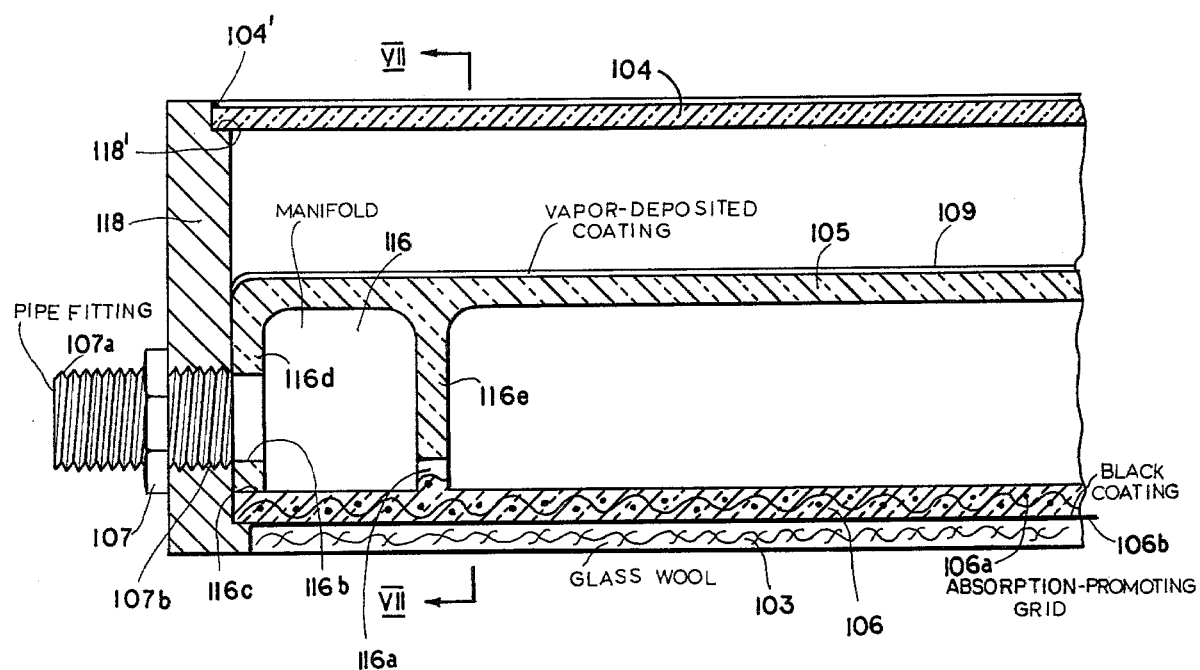
FIG. 6 is a view similar to FIG. 4 but illustrating another embodiment of the invention.
Figure 7:
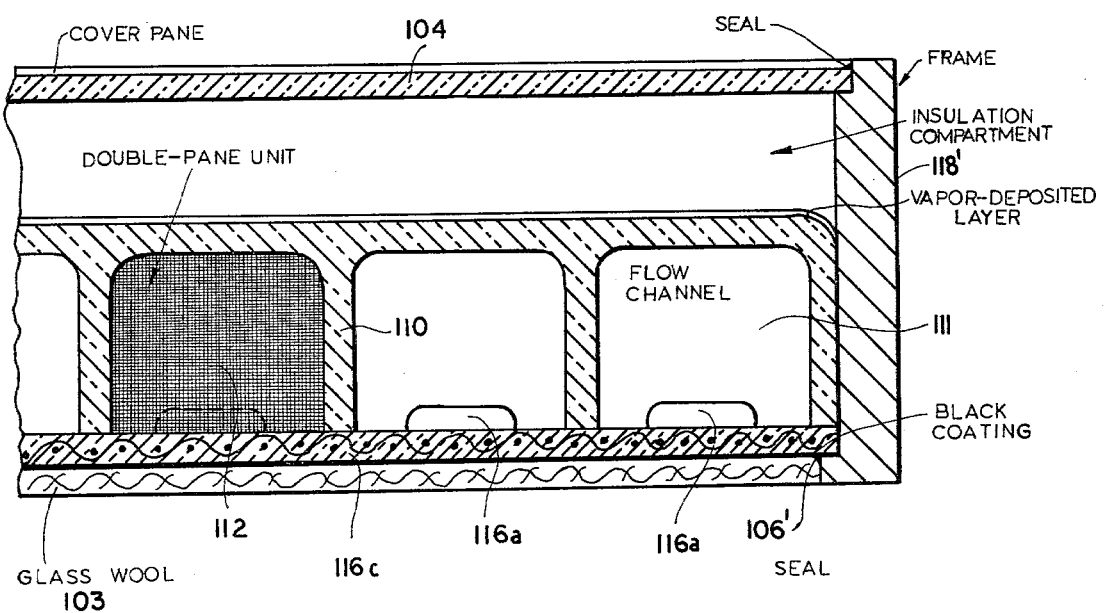
FIG. 7 is a view similar to FIG. 5 but corresponding to the embodiment shown in FIG. 6.

Another embodiment has been illustrated in FIGS. 6 and 7. In this embodiment, frame elements 118 are provided with a step 118' against which the outer glass pane 104 is seated, being secured by a bead 104' of a sealing material, e.g. a polyurethane.

A pipe fitting 107 serving as an inlet or outlet in this embodiment is threaded into a frame member 118 and has a thread 107b engaging this frame member while an outer thread 107a serves for connection to the supply or discharge lines with which the solar collector is associated.

The upper pane 105 of the hermetically sealed double-pane unit is here shown to have a coating 109 on its surface turned toward the sun, e.g. as applied by vapor deposition in the manner described. The upper pane 105 is also provided with downwardly bent flanges 116d and 116e defining a manifold 116 between them. The manifold communicates by openings 116a with flow passages 111 defined by partitions 110 which are integral with the upper or first pane 105 of the double-pane unit. The partitions 110 and the flanges 116d are bonded at 116c to the planar lower or second pane 106. The latter is provided with a black coating 106b to increase its absorption capability and also receives an insert 106a, preferably an absorption-promoting grid of black oxide-coated metal wire.

A glass-wool insulating layer 103 is bonded to the black coating 106b.

Naturally, in this embodiment the channels 111 are also provided with turbulence-promoting undulating screens 112 as shown in FIG. 7.

The hermetically sealed unit 106, 105 is bonded to the frame member 118 by a seal 106'. The device illustrated in FIGS. 6 and 7 operates similarly to that of the embodiment of FIGS. 1-5.

We claim:
1. A solar-energy collector comprising:
   a double-pane insulating unit having a first pane with first and second surfaces transparent to solar energy and with said first surface turned toward the sun and a second pane turned away from the sun, said panes defining between them a flow chamber for a fluid adapted to pick up heat from incident sunlight;

a cover pane spaced from said first pane and defining a gas-containing dead-air space therewith;

inlet and outlet fittings connected to said flow chamber for admitting said fluid to and discharging said fluid from said flow chamber;

an emission-limiting coating on said first surface of said first pane adjoining said dead-air space; and heat-transfer-promoting means in said flow chamber between said first and second panes.

2. The solar-energy collector defined in claim 1, further comprising a frame, said unit being mounted in said frame together with said cover pane, said first pane being composed of glass, and said fittings being mounted in said frame.

3. The solar-energy collector defined in claim 2 wherein said second pane is profiled and defines flow passages in said flow chamber for said fluid with said first pane.

4. The solar-energy collector defined in claim 3 wherein said coating is selected from the group which consists of tin dioxide, indium oxide, cadmium stannate and multilayer emission-limiting coatings.

5. The solar-energy collector defined in claim 3 wherein said coating is vapor-deposited on said first pane.

6. The solar-energy collector defined in claim 3 wherein said second pane has a dark coloration.

7. The solar-energy collector defined in claim 3 wherein said second pane is provided with a coating of dark coloration.

8. The solar-energy collector defined in claim 3, further comprising a thermal-absorption-promoting inlay embedded in the material of said second pane.

9. The solar-energy collector defined in claim 3 wherein said first pane is planar and the profiles of said second pane are bonded to said first pane to define said passages therewith.

10. The solar-energy defined in claim 3 wherein said heat-transfer-promoting means comprises a grid received in each of said passages for promoting turbulence therein.

11. The solar-energy collector defined in claim 10 wherein said grid is corrugated in the direction of flow of the fluid through the respective passage.

12. The solar-energy collector defined in claim 3 wherein said fittings are provided in opposite members of said frame and said unit is formed along said opposite members with respective manifolds having openings communicating with said passages for feeding said fluid to and collecting fluid from said passages.

* * * * *